Dec. 23, 1969   C. W. SIMPSON   3,485,094
FILM FRAME REGISTRATION AND MARKING DEVICE
Filed Jan. 10, 1968
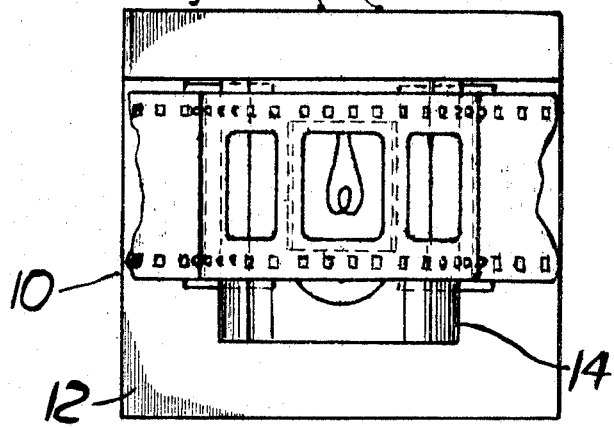
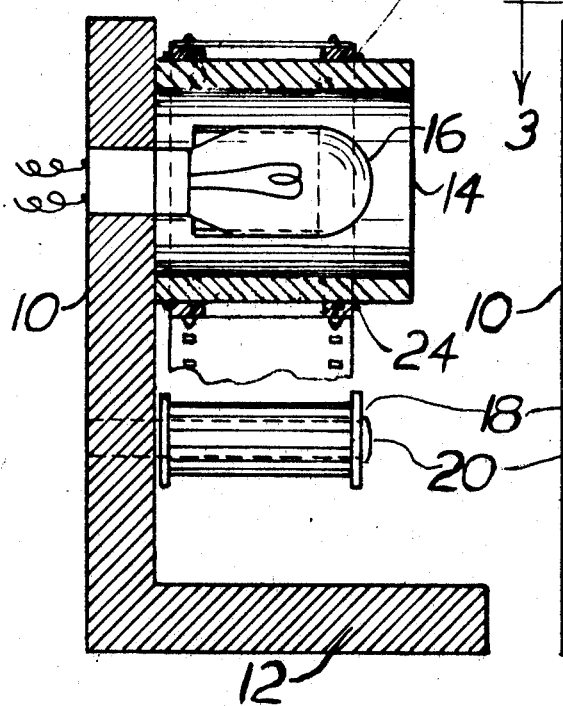
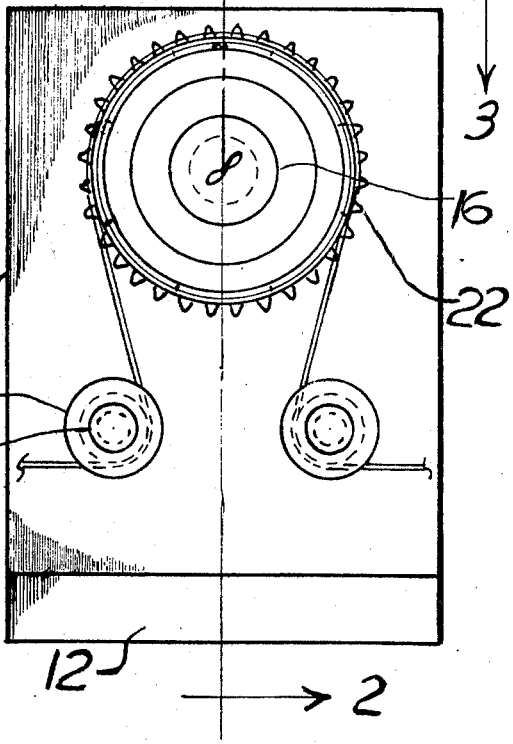
C. Wilkins Simpson
Inventor

United States Patent Office 3,485,094
Patented Dec. 23, 1969

3,485,094
FILM FRAME REGISTRATION AND MARKING DEVICE
Charles W. Simpson, 10656 Fuerte Drive,
La Mesa, Calif. 93305
Filed Jan. 10, 1968, Ser. No. 696,916
Int. Cl. G01b 5/16; G09f 13/10; G03d 15/04
U.S. Cl. 73—157                                    1 Claim

ABSTRACT OF THE DISCLOSURE

The invention provides a means of marking and splicing film having more than one set of sprocket holes per frame. Additionally the invention makes it possible to detect inaccurate splices in long lengths of film.

---

The present invention relates generally to a type of machine which makes it possible to wind film of a type generally similar to moving picture film having more than one set of sprocket holes per frame while maintaining capability for detection of correct frame registration without subsequent reference to frame markings on said film.

An object of the present invention is to provide for the rapid and accurate splicing of film in motion picture projection booths, film exchanges, and in any other application or place where film having more than one set of sprocket holes per frame is exhibited by a machine whose frame by frame film movement mechanism requires that the frame registration before and after the splice be the same.

Another object of the present invention is to provide the capability to make correctly registered splices in the film having more than one set of sprocket holes per frame in parts of the film which have no visible frame markings. An example of this application is the necessity in motion picture theaters of splicing short advertising films on the ends of films having blackouts which obliterate the frame lines.

Another object of the present invention is to make it possible to quickly determine if a reel of film having more than one set of sprocket holes per frame is correctly registered in frame throughout its entire length.

Another object of the present invention is to provide a film frame registration detection device which has capability of marking the location for a correctly frame registered splice to be made.

Another object of the present invention is to provide a film registration detection device which is small, light, simple, not requiring self-contained motive power, easy to operate, inexpensive to manufacture, and provided with an integral small light source.

These together with other objects and advantages which will become subsequently apparent reside in the details of construction and operation as more fully hereinafter described and claimed, reference being had to accompanying drawings forming a part hereof, wherein like numerals refer to like parts throughout and in which:

FIGURE 1 is an elevation view of the present invention.

FIGURE 2 is a vertical section taken, substantially upon a plane passing along section line 2—2 of FIGURE 1 illustrating the structural details of the invention.

FIGURE 3 is a transverse view along view line 3—3 of FIGURE 1 showing the film in process of being frame registered and/or marked for splicing.

Referring now specifically to the drawings, the numeral 10 generally designates the frame registration device which includes a supporting structure 12 mounted on which is a transparent plastic viewing tube 14 inside of which is an incandescent lamp assembly 16. Also on the structure 12 are mounted on shaft 20, on which are mounted guide rollers 18, free to rotate, but restrained axially.

Mounted on the transparent plastic viewing tube 14 is the registration sprocket 22 free to rotate but constrained axially by rings 24. The registration sprocket 22 is of such a diameter as to provide on its outer circumference for an exactly integral number of frames of the type of film used, and has protruding from it's outer periphery exactly the number of sprocket teeth to match the frames involved. The sprockets is opaque except in the area beneath where frames would appear on the film in question, if said film is circumferentially in contact with the sprocket 22. In this area, the sprocket is cut through, congruent to the shape of frame printed on the film and slightly larger, such that light from incandescent lamp assembly 16 is free to radiate through the transparent plastic viewing tube 14 and through the film to show the viewer whether the film frame is indeed coincident with the frame apertures on the registration sprocket 22.

Indicator marks on the outer periphery of the registration sprocket 22 may be used as a guide to mark the film for cutting and splicing after removal from the present invention.

The film after engagement with the sprocket 22 and interlacement with the guide rollers 18 may be pulled through the present invention by any appropriate means such as a hand or motor driven film rewinder, or by hand. Since the sprocket 22 contains an integral number of frames, any length of properly frame registered film placed with its frames coincident to the frame apertures of the sprocket 22 may be drawn through the present invention with each of its frames remaining coincident to the framing apertures on the sprocket 22. Any misregistration in the film however will be apparent as a non-coincident registration with respect to the apertures of the present invention. In the present invention, sprocket 22 can rotate in either direction.

The foregoing is considered illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:
1. A frame registration detection and marking device for use with film generally similar to motion picture film having more than one set of sprocket holes per frame, said device comprising:
   (A) a base structure;
   (B) guide rollers mounted on said base structure;
   (C) a transparent plastic viewing tube mounted on said base structure;
   (D) an incandescent lamp assembly positioned inside said tube;
   (E) a registration sprocket mounted on said tube,
      (1) said sprocket being free to rotate but axially constrained,

(2) said sprocket having sprocket teeth to match the sprocket holes of the film being tested, (3) said sprocket having an integral number of frame apertures on its outer circumference, such that said frame apertures are in alignment with properly registered frames of the film being inspected but such that improperly registered frames of said film will not be in alignment with said apertures, and (4) said sprocket further having indicator marks on its outer circumference, said indicator marks serving as a guide for marking said film for splicing.

References Cited

UNITED STATES PATENTS

| 1,044,258 | 11/1912 | Schafer | 156—502 XR |
| 1,279,445 | 9/1918 | Rosenfeld | 73—157 |
| 1,334,028 | 3/1920 | Gibbs | 73—157 |
| 1,480,845 | 1/1924 | Vidaver | 73—157 |

LOUIS R. PRINCE, Primary Examiner

J. NOLTON, Assistant Examiner

U.S. Cl. X.R.

40—106.1; 156—502